US010436111B2

(12) United States Patent  
Nolfi et al.

(10) Patent No.: US 10,436,111 B2  
(45) Date of Patent: Oct. 8, 2019

(54) FOREIGN MATERIAL EXCLUSION DEVICE AND RETAINING MEMBER THEREFOR

(71) Applicant: ADVANCED F.M.E. PRODUCTS, INC., Mentor, OH (US)

(72) Inventors: Thomas J. Nolfi, Chardon, OH (US); Mario M. Nolfi, Concord Township, OH (US)

(73) Assignee: ADVANCED F.M.E. PRODUCTS, INC., Mentor, OH (US)

( * ) Notice: Subject to any disclaimer, the term of this patent is extended or adjusted under 35 U.S.C. 154(b) by 131 days.

(21) Appl. No.: 15/626,710

(22) Filed: Jun. 19, 2017

(65) Prior Publication Data

US 2018/0363826 A1    Dec. 20, 2018

(51) Int. Cl.
*F16L 55/10* (2006.01)
*F02C 7/00* (2006.01)
*F16L 57/00* (2006.01)
*F16L 55/11* (2006.01)

(52) U.S. Cl.
CPC ............ *F02C 7/00* (2013.01); *F16L 55/1141* (2013.01); *F16L 57/005* (2013.01); *F05D 2230/00* (2013.01)

(58) Field of Classification Search
CPC .............................. F16L 55/11; F16L 55/1141
USPC ................................................. 138/89, 90, 91
See application file for complete search history.

(56) References Cited

U.S. PATENT DOCUMENTS

| | | | |
|---|---|---|---|
| 94,815 A * | 9/1869 | Franklin | B29C 33/485 425/403 |
| 685,561 A * | 10/1901 | Bettermann | F16L 55/134 138/91 |
| 798,031 A | 8/1905 | Gherky | |
| 1,493,501 A | 5/1924 | Rice | |
| 2,245,887 A | 6/1941 | Wikander | |
| 2,367,480 A | 1/1945 | Eardley | |
| 2,628,384 A * | 2/1953 | Shomber | A47B 91/06 138/89 |
| 2,632,198 A * | 3/1953 | Becker | A47B 91/04 138/89 |
| 3,203,460 A * | 8/1965 | Gerhard | E21B 17/043 138/89 |
| 3,618,809 A | 11/1971 | Martino | |
| 3,726,319 A | 4/1973 | Patterson | |
| 3,886,977 A * | 6/1975 | Dorgebray | F16L 55/136 138/89 |
| 4,060,100 A | 11/1977 | Miller et al. | |
| 4,069,852 A | 1/1978 | Lofberg | |
| 4,142,371 A | 3/1979 | Mayfield | |
| 4,184,515 A | 1/1980 | Streich | |

(Continued)

*Primary Examiner* — James F Hook
(74) *Attorney, Agent, or Firm* — Hudak, Shunk & Farine Co. LPA

(57) ABSTRACT

A retaining member particularly suitable for use as part of a foreign material exclusion device that can be used to temporarily seal an area of a construction from foreign material or debris, wherein the retaining member includes a post adapted to be inserted through a body of the foreign material exclusion device and cap having a rim and a fitting, the latter mateably engageable with an end of the post. The post and fitting each include through bores that are alignable such that they can be connected, for example with an extraction member of the foreign exclusion material device. Foreign material exclusion devices including the retaining member are disclosed.

16 Claims, 6 Drawing Sheets

(56) References Cited

U.S. PATENT DOCUMENTS

| | | |
|---|---|---|
| 4,286,629 A | 9/1981 | Streich |
| 4,328,904 A | 5/1982 | Iverson |
| 4,423,754 A | 1/1984 | Carter, Jr. |
| 4,462,430 A | 7/1984 | Anthony et al. |
| 4,549,580 A | 10/1985 | Freeman |
| 4,612,961 A | 9/1986 | Vetter |
| 4,762,151 A | 8/1988 | Kinnan |
| 4,871,597 A | 10/1989 | Hobson |
| 4,964,438 A | 10/1990 | Welty |
| 4,984,322 A | 1/1991 | Cho et al. |
| 5,016,674 A * | 5/1991 | Kiss ................ F28F 11/04 138/89 |
| 5,038,830 A * | 8/1991 | Arnaud ............ F16L 55/132 138/89 |
| 5,164,575 A | 11/1992 | Neeley et al. |
| 5,197,605 A | 3/1993 | Hampton |
| 5,297,691 A | 3/1994 | Bottcher |
| 5,390,964 A | 2/1995 | Gray, Jr. |
| 5,558,130 A | 9/1996 | McCabe et al. |
| 5,623,971 A | 4/1997 | Foernzler |
| 5,644,394 A | 7/1997 | Owens |
| 5,690,469 A | 11/1997 | Deal et al. |
| 5,735,425 A | 4/1998 | Beadle |
| 5,765,993 A | 6/1998 | Weiss |
| 5,771,937 A | 6/1998 | Collins |
| 5,904,965 A | 5/1999 | Noel et al. |
| 5,927,000 A | 7/1999 | Bordes, Jr. |
| 6,032,515 A | 3/2000 | Huber |
| 6,105,618 A | 8/2000 | Blaney |
| 6,170,529 B1 | 1/2001 | Howe |
| 6,173,491 B1 | 1/2001 | Goodwater et al. |
| 6,223,776 B1 * | 5/2001 | Glassell ................ F16L 55/10 138/89 |
| 6,227,132 B1 | 5/2001 | Garcia |
| 6,244,301 B1 | 6/2001 | Scott et al. |
| 6,360,779 B1 | 3/2002 | Wagner et al. |
| 6,381,797 B1 | 5/2002 | Filippovitch et al. |
| 6,419,104 B1 | 7/2002 | Sarajian |
| 6,453,603 B1 | 9/2002 | Baker |
| 6,506,014 B1 | 1/2003 | Nolfi et al. |
| 6,662,490 B1 | 12/2003 | Aesch |
| 6,726,099 B2 | 4/2004 | Becker et al. |
| 6,796,449 B2 | 9/2004 | Fragola |
| 6,824,356 B2 | 11/2004 | Nolfi et al. |
| 7,533,698 B2 | 5/2009 | Nolfi et al. |
| 8,776,949 B2 | 7/2014 | Oswalt |
| 8,967,203 B2 | 3/2015 | Nolfi et al. |
| 2003/0021678 A1 | 1/2003 | Nolfi |
| 2004/0028523 A1 | 2/2004 | Nolfi |
| 2005/0279010 A1 | 12/2005 | Krog |
| 2006/0001264 A1 | 1/2006 | Brass et al. |
| 2007/0059162 A1 | 3/2007 | Nolfi |
| 2007/0284011 A1 | 12/2007 | Freyer |
| 2009/0314787 A1 | 12/2009 | Reusche et al. |
| 2011/0169630 A1 | 7/2011 | Nolfi |
| 2011/0258834 A1 * | 10/2011 | Allen ................ F16L 55/132 29/525 |
| 2011/0315258 A1 | 12/2011 | Tomimbang |
| 2014/0261831 A1 * | 9/2014 | Nolfi ................ F16L 55/105 138/89 |

* cited by examiner

FOREIGN MATERIAL EXCLUSION DEVICE AND RETAINING MEMBER THEREFOR

FIELD OF THE INVENTION

The present invention relates to a retaining member particularly suitable for use as part of a foreign material exclusion device that can be used to temporarily seal an area of a construction from foreign material or debris, wherein the retaining member includes a post adapted to be inserted through a body of the foreign material exclusion device and cap having a rim and a fitting, the latter mateably engageable with an end of the post. The post and fitting each include through bores that are alignable such that they can be connected, for example with an extraction member of the foreign exclusion material device. Foreign material exclusion devices including the retaining member are disclosed.

BACKGROUND OF THE INVENTION

During assembly or maintenance of various assemblies or constructions in various industries, it is desirable to prevent the introduction of debris into one or more areas to prevent damage to various objects or prevent safety hazards. Foreign material exclusion is of particular concern in the field of power generation and supply, whether nuclear, hydro or fossil fueled in order to prevent or reduce power shortages and outages, as well as increase nuclear safety.

While undergoing maintenance or assembly, small parts, screws, bolts, or other foreign objects can fall into crevices. If not prevented, retrieved or noticed, such parts can have the potential to destroy or at least damage a particular unit and produce varying consequences, potentially catastrophic.

U.S. Pat. No. 6,506,014 relates to a device which can be utilized to temporarily seal substantially any opening on a turbine which is being assembled or repaired. The foreign material exclusion device reportedly advantageously maintains fail-safe integrity of desired portions of a turbine. Protection of the sensitive areas of a turbine prevents possible hazardous malfunctions in control valves or circuits. Prevention of debris contacting rotating turbine blades during operation is critically important as damaged blades impart vibration requiring controlled shutdown or explosive breakage of the blade causing extensive damage and uncontrolled shutdown. The foreign material exclusion device is substantially elastic or resilient and can be compressed to fit into a desired opening and can be re-expanded to provide a snug fit about an opening.

U.S. Pat. No. 6,824,356 relates to a device which can be utilized to temporarily seal substantially any opening on a turbine which is being assembled or repaired. The foreign material exclusion device includes a main body, preferably formed from a foamed polymer or rubber. The foreign material exclusion device is substantially elastic or resilient and can be compressed to fit into a desired opening and can be re-expanded to provide a snug fit about an opening. An extraction member is connected to the main body and is preferably utilized to remove the device from a portion of a cavity of a turbine.

U.S. Pat. No. 7,533,698 relates to a foreign material exclusion device which is adapted to be utilized in tubes, pipes, or the like to prevent entry of debris into a potentially sensitive area of an assembly, such as a turbine assembly utilized in a power plant. In one embodiment, the device is adapted to be connected to a non-moving portion of a rotary milling tool, such as the collet, before a milling operation to prevent milling debris from entering a sensitive portion of a tube or pipe. In a further embodiment, each device of the invention includes a unique identifier or identification element, such as a machine readable bar code or RFID (radio frequency identification) tag, to insure all devices utilized for a particular job are accounted for.

U.S. Pat. No. 8,967,203 relates to foreign material exclusion devices especially adapted to be positioned in a construction, for example a tube or pipe to temporarily seal off a potentially sensitive area of the construction from foreign materials or debris. In one embodiment the device includes a specifically defined, fixed-size eyelet to assist with insertion and/or removal of the device from a construction. Still other embodiments of the device include cavities that retain a trackable coating applied to the device. Further embodiments include identification elements embedded and thus protected within the frame of the device.

SUMMARY OF THE INVENTION

While the above-identified art provides useful, alternative solutions for foreign material exclusion, it would be desirable to provide an alternative design of a foreign material exclusion device that is reliable, durable, easy to maintain, of relatively low complexity and can be assembled and disassembled in the field as necessary, such as for cleaning and replacement of parts.

The foreign material exclusion devices of the present invention meet the above-described needs as well as others that should be apparent from reading the specification.

Accordingly, in one embodiment of the present invention, a foreign material exclusion device is provided having a unique retaining member including a post and a cap, the post having a base adapted to provide support for a resilient body and facilitate removal of the device from an area of a construction.

In an additional embodiment, the post is provided with a through bore at an end of the post, opposite a first end connected to the base. In a preferred embodiment, the through bore is substantially transverse to an axial direction of the post.

In a further embodiment, the retaining member cap is mateably engageable with the post. To this end, the cap is provided with a fitting, also having a through bore. When the cap is engaged on the post, the through bore of the cap fitting and the through bore of the post are alignable, such that an extraction member can be inserted through both through bores thereby locking the cap to the post.

Another embodiment of the present invention provides a foreign material exclusion device having a retaining member that includes a plurality of posts, preferably connected to a common base in one embodiment, and spaced apart at a desired distance. This arrangement allows for greater support when a body is utilized of a relatively large size.

Providing the retaining member with one or more posts connected to a common base provides increased strength over existing devices without the same, for example, having a bottom plate and a through tube through which an extraction member can extend. The integral post and base assembly, being manufactured in one piece, provides strength by spreading axial, radial and torsional forces through the assembly. In addition, the cap with a rim that forms an upper plate is fitted over into the post, with the cap being compressed against the body of the foreign material exclusion device, which is preferably formed from a resilient foamed polymeric material. In one embodiment, the extraction member is inserted into alignment holes in the post and cap, preferably with the body being compressed therebetween.

Due to the arrangement of through bores in the post and cap, compression of the body is maintained after assembly between the lower surface of the cap and the upper surface of the base. This provides additionally torsional, axial and radial rigidity to the body and the additional benefit of sealing the retaining member, as it is difficult for debris to migrate under the rims of the base and cap.

In a further embodiment, indicia is printed directly onto a visible surface of one or more of the cap and base, such as the upper surface of the cap or lower surface of the base. The indicia allows a user quickly and easily access information regarding the retaining member and/or intended use of the retaining member.

In an additional embodiment the extraction member is locked to the retaining member 10, for example utilizing heat shrink tubing. The heat shrink tubing can be printed with additional product information. In this manner, users may have indicia such as production part and production lot numbers visible, as well as any additional product information desired. The use of a label is eliminated with the designs of the present invention.

In one aspect a foreign material exclusion device is disclosed comprising a post, a base and a cap, the post having a length in an axial direction, the post having a width measured in a direction perpendicular to the axial direction, the base directly connected to one end of the post, the base extending in a direction outwardly away from the post, the base having a minimum width measured in a direction perpendicular to the axial direction that is greater than the maximum width of the post, the post including a through bore, located in a second end of the post, the cap having a rim and a fitting mateable with the second end of the post, the fitting having a fitting through bore alignable with the post through bore, wherein the cap rim has a minimum width measured in a direction perpendicular to the axial direction that is greater than the maximum width of the post.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
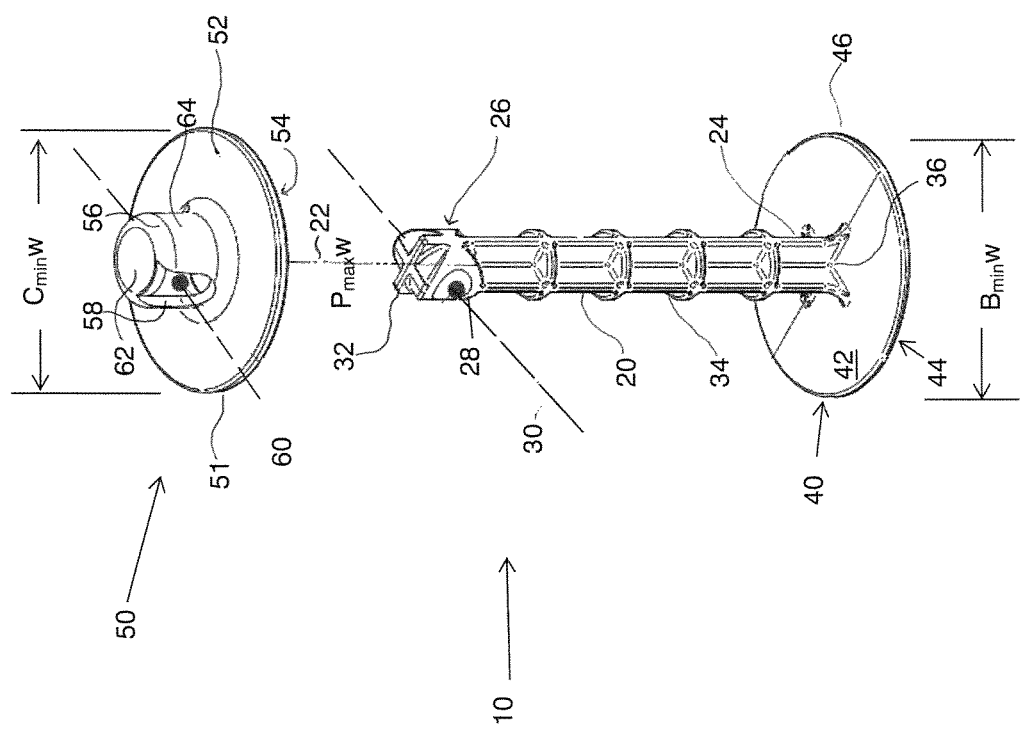
FIG. 1 is an exploded slightly downward looking perspective view of one embodiment of a retaining member of the preset invention including a single post and a cap.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The foreign material exclusion devices of the present invention are especially adapted to be temporarily positioned in a construction, for example, but not limited to, a tube, a pipe, an orifice, a cavity, or the like to seal off a potentially sensitive area of the construction from foreign materials, debris or the like. As an example, it is desirable to protect a construction such as a turbine and a power plant from debris as the turbine can be catastrophically damaged by parts, metal shavings or the like. Foreign material exclusion devices can be utilized during construction, assembly, repair or the like of a portion of a product such as, but not limited to, a turbine, a pump, a fan, a housing, a boiler tube, an engine or any other device with limited access openings and/or cavities.

Figure 3:
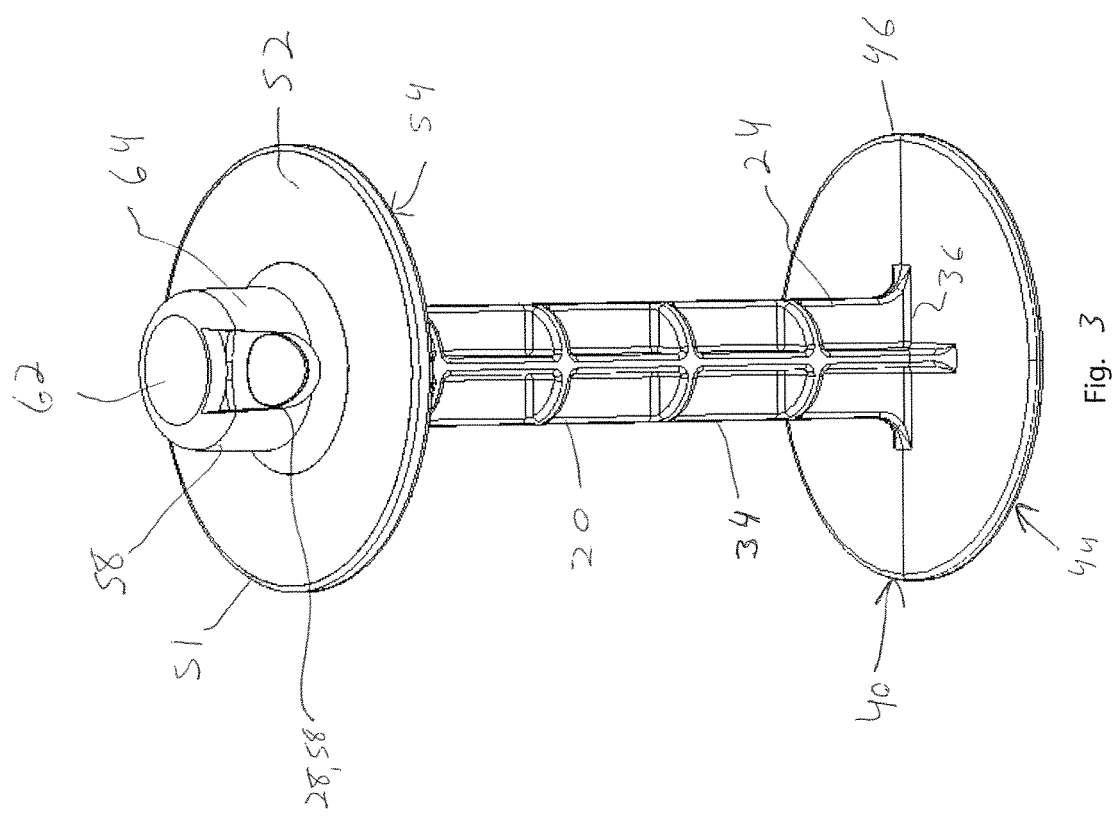
FIG. 3 is an elevational view of one embodiment of the retaining member showing the cap installed on the post, wherein the through bores thereof are aligned.
Figure 5:
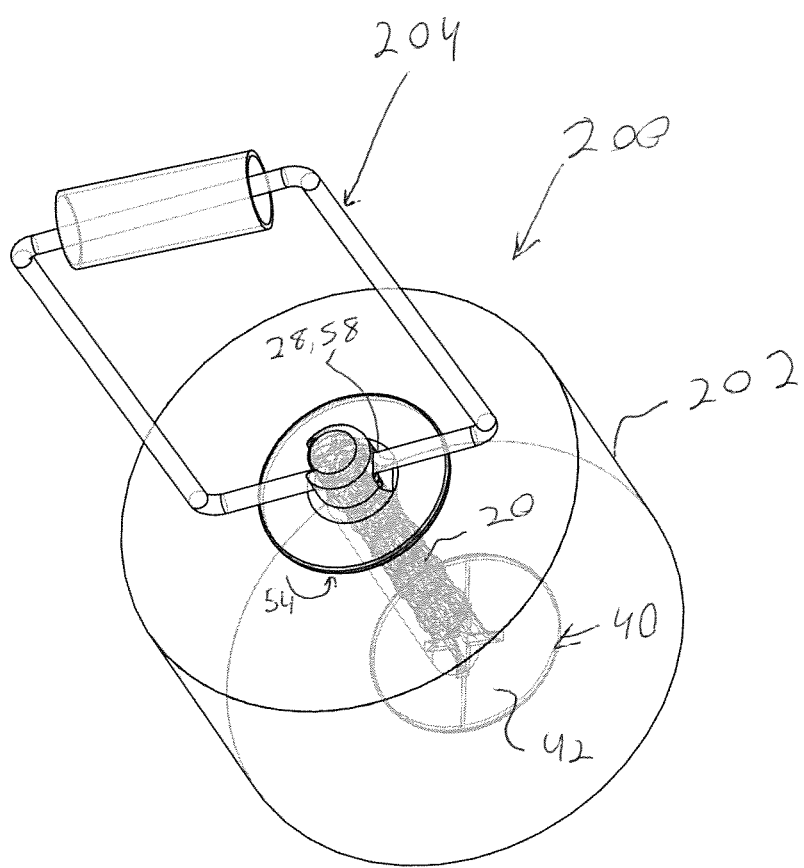
FIG. 5 is an elevational view of one embodiment of a foreign material exclusion device of the present invention including a single post and a cap.

Referring now to the drawings, wherein like parts or components are represented by like or identical reference numbers throughout the several views, FIGS. 1, 3 and 5 illustrate embodiments of a retaining member 10 including a post 20, a base 40, and a cap 50. In FIG. 1, the base 40 is shown connected permanently to post 20. However, it is to be understood that the base may be operatively connected to the post through use of a suitable fastener or an adhesive or any other connection that would allow the base to be removed from the post. The base is preferably connected to post permanently, such as when the post and base are formed as a single unit utilizing a molding process, such as injection molding. Advantages of having a post formed integral with the base are described above.

Base 40 is connected to post 20 at a first end 24 of the post. Post 20 has a central axis 22 extending along the longitudinal length or height of the post as illustrated in FIG. 1. Post second end 26 is located opposite first end 24. Second end 26 includes a through bore 28 which extends through the side 34 of post 20 below top 32. The through bore has a through bore central axis 32 that is disposed in relation to central axis 22 of post 20. Through bore central axis 30 is preferably perpendicular to central axis 22, but can be disposed at an angle in some embodiments from about 45 to about 135° and generally less than 60° to about 120° with respect to the central axis.

Bottom 36 of the first end 24 of post 20 is connected to an upper surface 42 of base 40. Base 40 also includes a lower surface 44, opposite upper surface 42 of the base. The base 40 extends outwardly from bottom 36 of post 20 forming a rim 46.

Rim 46 of base 40 has a minimum width, $B_{min}w$, that is greater than a maximum width, $P_{max}w$, of post 40 measured in a direction perpendicular to the central axis 22. The ultimate dimensions, such as width and thickness of the rim 46 of base 40 generally depend upon the size of the body to be utilized in conjunction with the retaining member 10. The design of the rim 46 depends on factors such as size of the body, composition of the body and constructions in which the foreign material exclusion device will be utilized. That said, in various embodiments, the $B_{min}w$ is greater than or equal to 1.25 times the $P_{max}w$, or greater than or equal to 1.5 times the $P_{max}w$ or even greater than or equal to 2 times the $P_{max}w$.

The height of the post generally between bottom 36 and top 32 will likewise vary depending upon design factors such as height of the body, and composition of body. The width of the post 20 measured in direction perpendicular to central axis 22 can vary depending on factors such as the size and composition of the body as well.

Cap 50, such as illustrated in FIG. 1, includes a fitting 56 adapted to mateably engage with second end 26 of post 20. Cap 50 also includes a rim 51 having an upper surface 52 and a lower surface 54, with the rim 51 extending outwardly from a bottom part of fitting 56.

Rim 51 of cap 50 has a minimum width, see $C_{min}w$ that is greater than the maximum width, $P_{max}w$ of post 40 measured in a direction perpendicular to the central axis 22. The ultimate dimensions, such as the width and thickness of rim 51 of cap 50 generally depend upon the size of the body to be utilized in conjunction with retaining member 10. The design of the rim depends on factors, such as the size of the body, composition of the body and constructions in which the foreign material exclusion device will be utilized. That said, in various embodiments, the $C_{mm}w$ is greater than or equal to 1.25 times the $P_{max}w$, or greater than or equal to 1.5 times the $P_{max}w$ or even greater than or equal to 2 times the $P_{max}w$.

Fitting 56 includes a through bore 58 having a through bore central axis 60 that in one embodiment is disposed generally perpendicular to central axis 22. That said, cap through bore central axis 50 can be disposed at an angle in some embodiments from about 45° to about 135° and generally less than 60° to about 120° with respect to the central axis.

Fitting 56 has a top surface 62 and a side surface 64. While the fitting is shown being substantially cylindrical, other shapes can be utilized, such as square, rectangular, star shaped, etc. Additionally, it is noted that the rim 51 shown in FIG. 1 is round, but it is to be understood that other shapes can be utilized as well, such as square, rectangular, star shapes, as well as other non-geometrical shapes. The same is true with rim 46 of base 40. Likewise, the cross-sectional shape of the post 20 can also vary.

Fitting 56 of cap 50 is mateably engageable with the second end 26 of post 20. As can be clearly envisioned from FIG. 1, cap 50 can be lowered onto the second end 26 of post 20 and post through bore 28 can be coaligned with cap through bore 58 as shown in FIG. 3. Thereafter, an extraction member, as further described hereinbelow, can be extended through both through bores 28, 58, thereby fastening cap 50 to post 20, see FIG. 5 for example.

As illustrated in FIGS. 1, 3 and 5, the fitting 56 extends upwardly from the plane formed by rim 51 in one embodiment.

Figure 2:
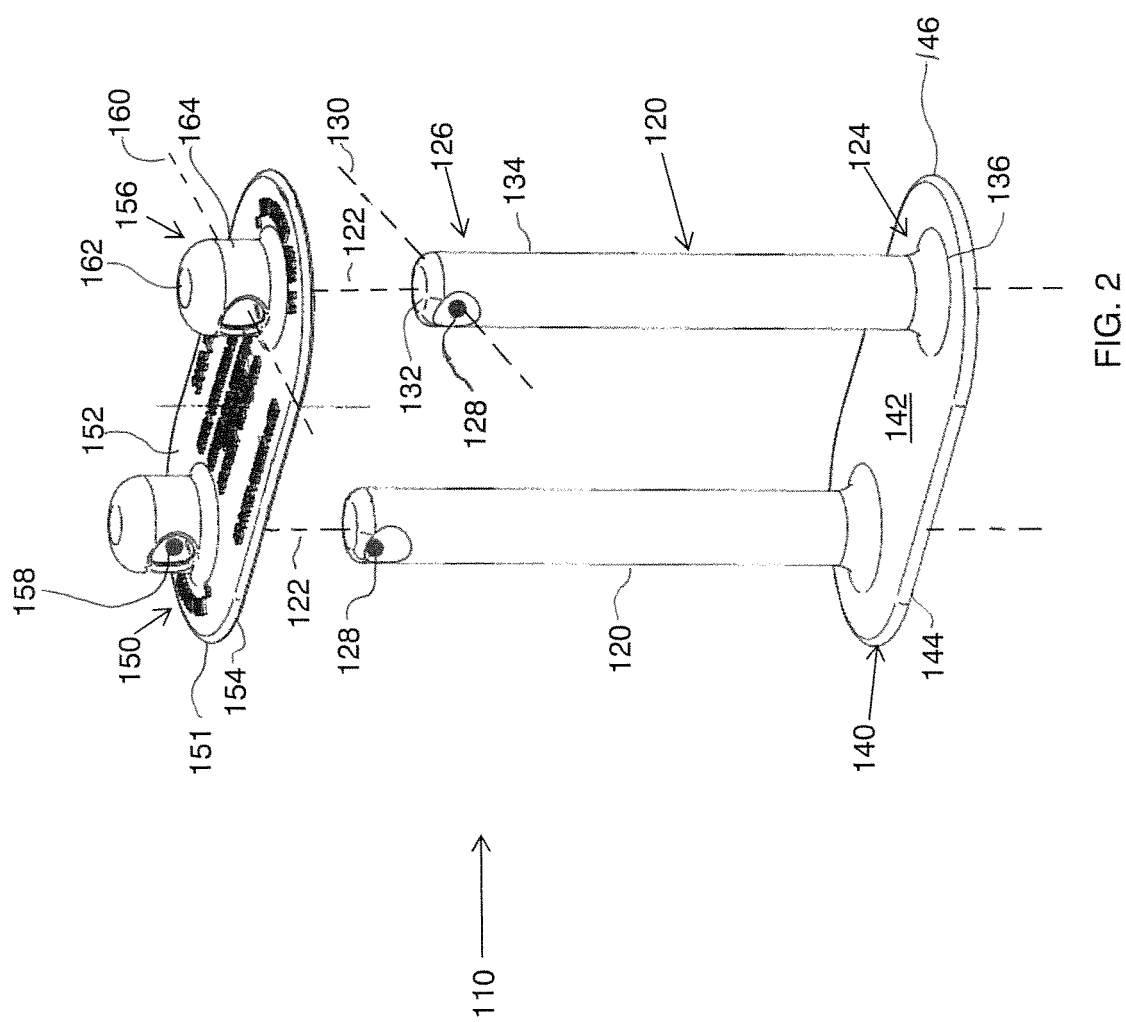
FIG. 2 is an exploded slightly downward looking perspective view of one embodiment of a retaining member of the preset invention including a plurality of posts and a cap having a plurality of fittings engageable with the posts.

FIG. 2 illustrates a second embodiment of a retaining member 110 including a pair of posts 120, a base 140 and a cap 150. Base 140 is shown integrally connected to posts 120 similar to FIG. 1. Posts 120 are connected to base 140 at a first end 124 of each of the posts. Each post 120 has a central axis 122 extending along the longitudinal length or height of the post as illustrated in FIG. 2. Second end 126 of post 120 is located opposite first end 124. The second end 126 includes a through bore 128 which extends through the side 134 of post 120 below top 132. Each through bore 128 has a central axis 132 that is disposed in relation to central axis 122 of post 120. The central axis 130 are shown generally perpendicular to central axis 122, but each, independently, can be disposed at an angle in some embodiments of about 45° to about 135° and generally less than 60° to about 120° with respect to the central axis.

As with the other embodiment, bottom 136 of first end 24 of post 120 is preferably integrally connected to an upper surface 142 of base 140, which also includes a lower surface 144, opposite upper surface 142. Base 140 extends outwardly from the bottom 136 of each post 120 forming a rim 146. As with the first embodiment, rim 146 of base 140 has a minimum width, $B_{min}w$, that is greater than a maximum width, $P_{max}w$, of post 140, measured in a direction perpendicular to the central axis 122. The design of the rim depends on factors such as the number of posts present and connected to base 140, size of the body, composition of the body and constructions in which the foreign material exclusion device will be utilized. The height of each post can vary as described hereinabove. That said, in various embodiments, the $B_{min}w$ is greater than or equal to 1.25 times the $P_{max}w$, or greater than or equal to 1.5 times the $P_{max}w$ or even greater than or equal to 2 times the $P_{max}w$.

Cap 150, as illustrated in FIG. 2, includes a pair of fittings 156 adapted to mateably engage with the pair of posts 120. Cap 150 also includes a rim 151 having an upper surface 152 and a lower surface 154 with the rim 151 extending outwardly from each fitting 156. One or more fittings 156 include a through bore 158 having a through bore central axis 160 that in one embodiment is disposed generally perpendicular to central axis 122. Through bores 158 can be disposed at angles as described above for central axis 50. Fitting 156 has a top surface 162 and a side surface 164. The size and shapes of each fitting 156, rim 146, post 120 and base 140 can vary as described herein with respect to the first embodiment.

Figure 4:
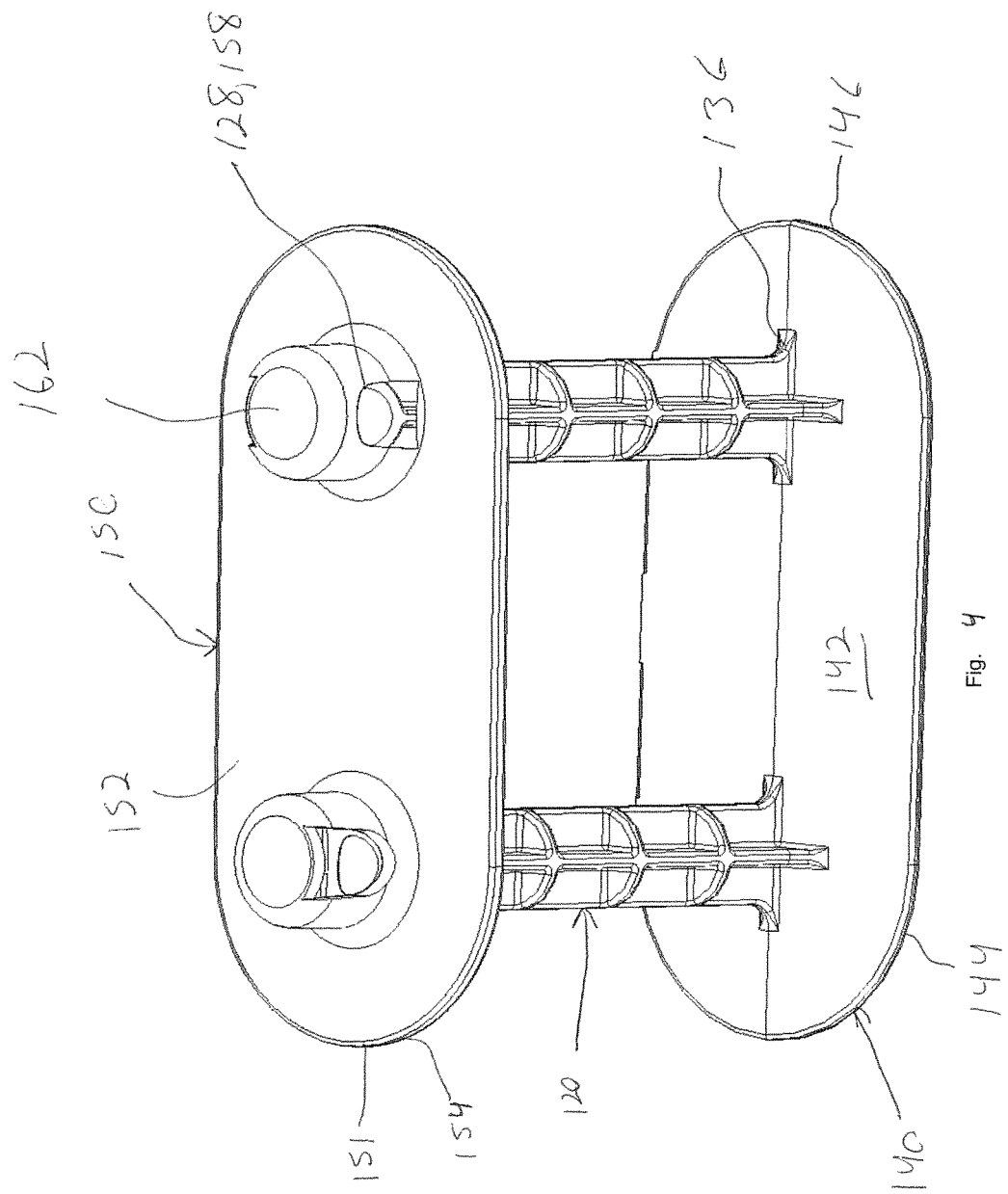
FIG. 4 is an elevational view of one embodiment of the retaining member showing the cap having a plurality of fittings installed on the plurality of posts, wherein the through bores thereof are aligned in pairs.
Figure 6:
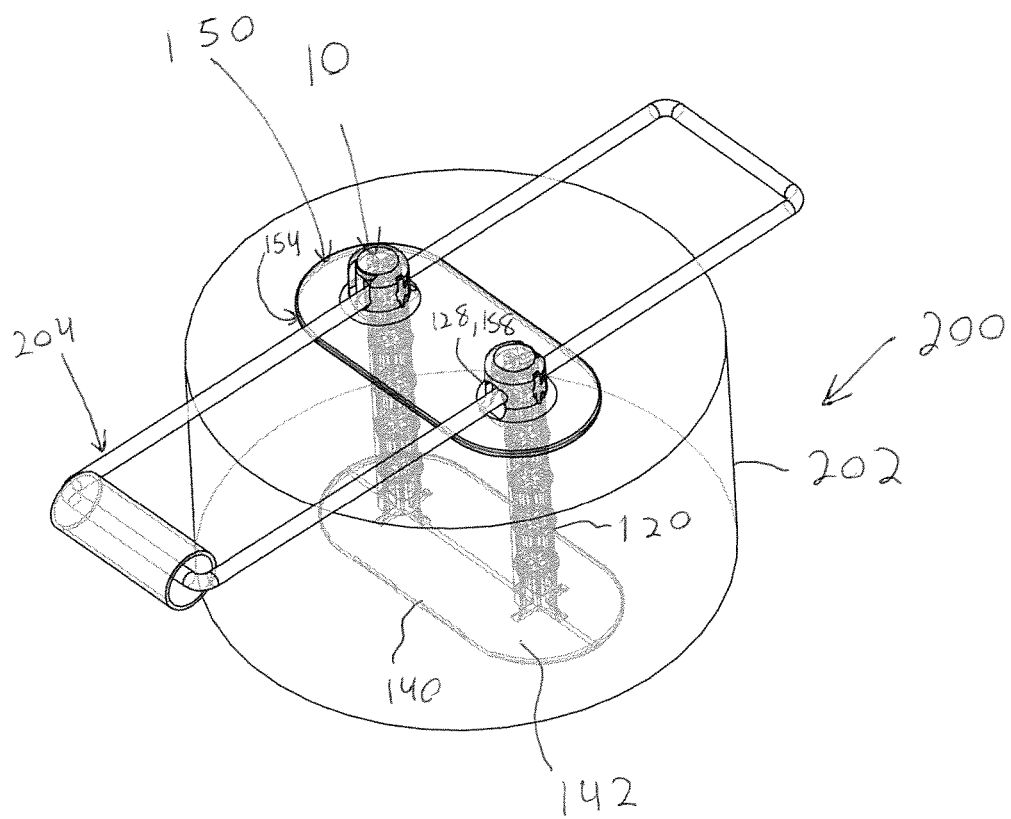
FIG. 6 is an elevational view of one embodiment of a foreign material exclusion device of the present invention including a double post and a cap with plurality of fittings.

As illustrated in FIGS. 2, 4 and 6, the fittings 156 extends upwardly from the plane formed by rim 151 in one embodiment.

As can be taken from FIG. 2, cap 150 can be lowered onto the second end 126 of post 120 and the post through bores 128 can be coaligned with cap through bores 158, see FIG. 4. Thereafter, an extraction member can be extended through both bores 128, 158 thereby fastening cap 150 to post 120, see FIG. 6.

FIG. 5 illustrates one embodiment of a foreign material exclusion device 200 that generally comprises a resilient body 202 operatively connected to retaining member 10 via extraction member 204. Post 20 of retaining member 10 extends through body 202 such that an upper surface 42 of base 40 contacts a lower surface of body 202. Lower surface 54 of cap 50 is in contact with or otherwise disposed adjacent to an upper surface of the body 202. An extraction member 204 extends through each of through bore 58 of fitting 56 and through bore 28 of post 20 thereby locking post 20 to cap 50.

Similarly, FIG. 6 illustrates an embodiment of a foreign material exclusion device 200 that generally comprises a resilient body 202, operatively connected to retaining member 10 via extraction member 204. Post 120 of retaining member 10 extends through body such that an upper surface 142 of base 140 contacts a lower surface of body 202. Lower surface 154 of cap 150 is in contact with or otherwise disposed adjacent to an upper surface of the body 202. An extraction member 204 extends through each of through bore 158 of fitting 156 and through bore 128 of post 120 thereby locking post 120 to cap 150.

The posts and caps of the present invention are preferably formed from a polymeric material, for example by injection molding. Other materials can be utilized. Polymers include one or more of homopolymers, copolymers and block copolymers, with the choice of polymer depending on factors including a type of construction with which the device will be utilized. In one embodiment the posts and caps are formed from a flame retardant polymer, such as a polyamide, for example Nylon 6.

The composition of body 202 of the exclusion device is generally a polymer, a rubber, or a polymer or rubber foam. It is important that body is elastic or resilient in nature so that it can be compressed to fit into a desired opening, and yet re-expand to provide a snug fit within or about the opening. The resiliency of body allows the foreign material exclusion device to hold itself in place in a predetermined location or orifice.

The actual size dimensions, i.e. the length, width, and thickness of body of foreign material exclusion devices of the present invention will vary depending on the size and shape of the orifice, tube, opening, etc. which is to be protected or isolated. That is, body of foreign material exclusion device is not limited to one specific geometric or random shape or size such as a cylinder, cube, block, or the like, but is custom tailored or profile fit to the dimensions of generally each cavity or turbine assembly orifice. That said, preferred foreign material exclusion devices have a body that is substantially cylindrical or block shaped. Body is dimensioned to provide a resilient snug fit with the above-mentioned orifice which thereby provides a barrier to the entrance of foreign materials. Foreign materials can generally be defined as any object, particle or the like such as, but not limited to, nuts, bolts, metal bits, debris, hand tools, sockets, measuring devices, or any other material not designed to be located in a desired area of a turbine assembly. Dimensions can vary widely by application, with the primary goal of foreign object exclusion requiring sufficient strength to retain the heaviest object used in that portion of the protected device.

Body of the material exclusion device of the present invention is generally formed from a polymer or rubber, and is preferably a foam or foam like material. Foams are cellular materials generally having small hollow spaces which occur during manufacture of the foam. If the cells are fully surrounded by cell walls, the foam is called closed cell foam. In mixed cell foams, the cell walls are partially perforated. In open cell foams, the cells have gas phase connections to each other. Any of the above-mentioned foam types can be utilized in the present invention so long as the foams can be resiliently compressed and prevent the foreign material from entering a predetermined area of the turbine. Generally, open cell foams are preferred as they are more flexible and elastomeric when compared to closed cell foams which tend to be compression resistant.

Suitable polymer compositions which can be foamed to form the body of the present invention include polyethylene, e.g. low density polyethylene and high density polyethylene (HDPE), polypropylene, and copolymers of ethylene or propylene and a monoethylenically unsaturated monomer copolymerizable therewith. Other suitable polyolefins include branched polypropylene homopolymer and branched copolymers of polypropylene. Examples also include copolymers of ethylene and acrylic acid or methyl acrylic acid and $C_1$-$C_4$ alkyl esters or ionomeric derivatives thereof; ethylene vinyl-acetate copolymers; ethylene/carbon monoxide copolymers; anhydride containing olefin copolymers of a diene; copolymers of ethylene and an alpha-olefin having ultra low molecular weight (i.e., densities less than 0.92 g/cc); blends of all of the above resins; blends thereof with polyethylene (high, intermediate or low density), etc.

Other suitable polymeric compositions which may be used in the practice of the invention include, but are not limited to, polyesters, polyamides, polyvinylchloride, polyvinylidene chloride, polycarbonates, polyurethanes, and polystyrene resins.

Rubbers include silicones and copolymers of ethylene and propylene and can be prepared by known addition polymerization techniques, including the use of small amounts of a diene such as butadiene. Additional rubber or elastomeric components include various conjugated dienes having from 4-8 carbon atoms such as isobutylene, butadiene, and ethylene/propylene/diene interpolymers may be included in the blend if desired. Rubbers include the aromatic containing rubbers such as styrene, butadiene rubber and the like. Moreover, additional components such as crosslinking agents designed to provide latent crosslinking of the ethylenic or propylenic polymer, such as silane functional crosslinking agents, or covalent or ionic crosslinking agents, may be included if desired.

The thermoplastic polymer material or blend is melt processed in a conventional manner by feeding, melting, and metering into a conventional melt processing apparatus such as an extruder. A volatile blowing agent and an optional crosslinking agent are mixed with the polyolefin polymer or blend under a pressure suitable to form a flowable gel or admixture. A crosslinking agent may be added in an amount which is sufficient to initiate crosslinking and raise the pressure of the mixture to less than that pressure which causes melt fracture of the polymer to occur. The term "melt fracture" is used in the art to describe a melt flow instability of a polymer as it is extruded through a die, which flow instability causes voids and/or other irregularities in the final product. Any other known methods for producing foam compositions can also be utilized to form the foam utilized in the present invention.

The foam blends are generally prepared by heating the desired polymer or rubber to form a plasticized or melt polymer material, incorporating therein a blowing agent to form a foamable gel, and extruding the gel through a die to form the foam product. Prior to mixing with the blowing agent, the resin or blend is heated to a temperature at or above its glass transition temperature or melting point. The blowing agent may be incorporated or mixed into the melt polymer material by any means known in the art, such as with an extruder, mixture, blender, or the like. The blowing agent is mixed with the melt polymer material at an elevated pressure sufficient to prevent substantial expansion of the melt polymer material and to generally disperse the blowing agent homogeneously therein. Optionally, a nucleating agent may be blended in the polymer melt or dry blended with the polymer material prior to plasticizing or melting. The foamable gel or melt is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam product. The zone of lower pressure is at a pressure lower than that in which the foamable gel is maintained prior to extrusion through the die. The lower pressure may be super-atmospheric or sub-atmospheric (vacuum), but is preferably at an atmospherical level.

The polymer or rubber foam may be open or closed-celled, as desired. The percentage of open cells can be controlled, as is well known in the art, by appropriate selection of blowing agents, additives, polymers, and processing parameters, such as temperatures, pressures, and extrusion rates. A preferred foam of the present invention is polyester and is available from sources including Orbis Manufacturing of Mentor, Ohio.

While the density of the foam can vary, the foams of the present invention are generally considered lightweight and range generally from about 1 to about 200 or 300 kg/m$^3$, desirably from about 5 to about 150 kg/m$^3$, and preferably from about 10 to 20 to about 50, about 75, or about 100 kg/m$^3$.

It is also possible to add various additives such as inorganic fillers, pigments, anti-oxidants, acid scavengers, ultra-violet absorbers, flame retardants, surfactants, processing aids, extrusion aids and the like is suitable as known to those of ordinary skill in the art.

Other additives include inorganic substances such as calcium carbonate, talc, clay, titanium oxide, silica, barium sulfate, diatomaceous earth and the like, carbon dioxide generated by the combination of a bicarbonate or a carbonate of sodium, potassium, ammonium or the like and an inorganic or organic acid such as boric acid, citric acid, tartaric acid or the like, thermal decomposition type chemical foaming agents such as azodicarbonamide, benzenesulfonyl hydrazide, toluene-sulfonyl hydrazide and the like.

The volatile foaming agents usable in this invention generally have a boiling point temperature range of −90° C. to +80° C., and include, but are not limited to, aliphatic hydrocarbons such as n-pentane, isopentane, neopentane, isobutene, n-butane, propane, ethane and the like; fluoro-chlorinated hydrocarbons such as dichlorotetrafluoroethane, trifluoroethane, trichloromonofluoromethane, dichloro-difluoromethane, dichloromonofluoromathane, and the like. Among them, the non-fully halogenated hydrocarbons are preferred because of environmental considerations. Particularly preferred among the non-fully halogenated hydrocarbons are partially or fully fluorinated hydrocarbons and non-fully halogenated fluorochlorinated hydrocarbons. Examples of these include 1-chloro-1,1-fluoro-ethane, 1,1,1,2-tetrafluoroethane and 1,1-difluoroethane. Particularly preferred among the aliphatic hydrocarbons are isobutene and isobutene/n-butane mixtures. Other blowing agents which may be employed include alcohols such as methanol and ethanol. Also contemplated are inorganic blowing agents such as carbon dioxide, water, nitrogen, argon and combinations thereof, as well as combinations of these inorganic blowing agents with hydrocarbon and/or halogenated hydrocarbon blowing agents. Also decomposable blowing agents, such as azobisformamide, may be incorporated with the volatile foaming agents. Mixtures of any or all of these volatile foaming agents are also contemplated within the scope of the invention. Also contemplated are combinations including water and/or carbon dioxide as the primary blowing agent.

Optionally, but preferably, a flame retardant, resistant, or quenching coating or covering is applied to any of the foreign material exclusion devices described in this application, preferably on at least body thereof. The flame retardant coating or covering can be applied to one or more sides of the body, especially the portion thereof which can be exposed to high temperature debris, chips, filings, etc., such as from a welding process on the construction. The coating or covering is also heat resistant. The coating or covering is any suitable thickness to provide the desired flame or heat resistant properties. In one embodiment, the coating or covering is on top of or in surface contact with at least a portion of the device, and in a second embodiment, saturates a portion of the body of the device in addition to being present on a surface. Coating or covering on the foreign material exclusion device has a sufficient thickness to achieve the desired goal of providing flame retardant, flame resistant, or the like properties. Coating or covering thickness may vary from surface to surface and vary on a single surface, and ranges generally from about 0.010 to about 0.25 inches, desirably from about 0.020 to about 0.20 inches, and preferably from 0.05 to about 0.15 inches.

Such coatings are well known in the art and are generally latexes such as HCF from PDI, Inc. of Circle Pines, Minn. Coverings of the present invention include, but are not limited to, woven and nonwoven, natural and synthetic fibers, and are available from many different commercial sources. In other embodiments, coverings are a layer(s) of organic or inorganic material, or a combination thereof, such as a polymer layer or a graphite layer.

The flame retardant coating or covering or combination thereof, is applied to at least one surface of a foreign material exclusion device of the invention utilizing one or more methods, including but not limited to, spray coating, roll coating, screen printing, bonding, or the like. Flame retardant coverings in one embodiment are applied utilizing an adhesive comprising a hot melt adhesive, an epoxy, a polyurethane, a phenolic resin or the like, with the adhesive disposed between the covering and foreign material exclusion device body surface. Hot melt adhesives are preferred in one embodiment. In a preferred embodiment, a sheet of body material having a predetermined thickness is coated with the coating on at least one surface by roll coating, spraying or the like. Afterwards, a desired number of device bodies are formed from the coated sheet. In one embodiment, body is cut from the sheet, preferably with a die cutting apparatus, waterjet cutting apparatus, or cold laser as known in the art.

The extraction member is connected to the device through the retaining member to allow the foreign material exclusion device to be removed from its location in the construction once the device is no longer necessary or needed. The extraction member can be formed as a rope, string, line or cable which can be manipulated by a person or other device in order to allow remote extraction of the foreign material exclusion device. The extraction member can be formed of generally any material, but is preferably a woven or non-woven natural or synthetic material. Nylon is preferred in one embodiment.

For the avoidance of doubt, the products and device of the present invention encompass all possible combinations of the components, including various ranges of said components, disclosed herein. It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

What is claimed is:

1. A retaining member, comprising:
a post, a base and a cap, the post having a length in an axial direction, the post having a width measured in a direction perpendicular to the axial direction, the base directly connected to one end of the post, the base extending in a direction outwardly away from the post, the base having a minimum width measured in a direction perpendicular to the axial direction that is greater than the maximum width of the post, the post including a through bore, located in a second end of the post, the cap having a rim and a fitting mateable with the second end of the post, the fitting having a fitting through bore coalignable with the post through bore along a single central axis, wherein the cap rim is integral with the fitting and extends outwardly from the fitting and has a minimum width measured in a direction perpendicular to the axial direction that is greater than the maximum width of the post, wherein the post through bore extends in a direction substantially perpendicular to the axial direction of the post and wherein the fitting through bore extends in a direction substantially perpendicular to the axial direction of the post.

2. The retaining member according to claim 1, wherein the post and base are an integral, single piece construction.

3. The retaining member according to claim 2, wherein the cap rim has a minimum width that is greater than or equal to 1.25 times the post maximum width, and wherein the base minimum width is greater than or equal to 1.25 times the post maximum width.

4. The retaining member according to 3, wherein the cap rim has a minimum width that is greater than or equal to 1.5 times the post maximum width, and wherein the base minimum width is greater than or equal to 1.5 times the post maximum width.

5. The retaining member according to 4, wherein the cap rim has a minimum width that is greater than or equal to 2 times the post maximum width, and wherein the base minimum width is greater than or equal to 2 times the post maximum width.

6. The retaining member according to claim 1, wherein two or more posts are connected to the base.

7. The retaining member according to claim 1, wherein the cap fitting extends in an axial direction away from an upper surface of the cap rim.

8. A foreign material exclusion device, comprising:
a post, a base and a cap, the post having a length in an axial direction, the post having a width measured in a direction perpendicular to the axial direction, the base directly connected to one end of the post, the base extending in a direction outwardly away from the post, the base having a minimum width measured in a direction perpendicular to the axial direction that is greater than the maximum width of the post, the post including a through bore, located in a second end of the post, the cap having a rim and a fitting mateable with the second end of the post, the fitting having a fitting through bore alignable with the post through bore, wherein the cap rim has a minimum width measured in a direction perpendicular to the axial direction that is greater than the maximum width of the post; and
a body, the body having a through bore through which the retaining member post extends, the body comprising resilient material, the body being compressed between a lower surface of the rim and an upper surface of the base, wherein the device further includes an extraction member, wherein the extraction member extends through the cap through bore and the post through bore.

9. A foreign material exclusion device according to claim 8, wherein the post and base are an integral, single piece construction.

10. The retaining member according to claim 9, wherein the cap rim has a minimum width that is greater than or equal to 1.25 times the post maximum width, and wherein the base minimum width is greater than or equal to 1.25 times the post maximum width.

11. The retaining member according to 13, wherein the cap rim has a minimum width that is greater than or equal to 1.5 times the post maximum width, and wherein the base minimum width is greater than or equal to 1.5 times the post maximum width.

12. The retaining member according to 14, wherein the cap rim has a minimum width that is greater than or equal to 2 times the post maximum width, and wherein the base minimum width is greater than or equal to 2 times the post maximum width.

13. The retaining member according to claim 8, wherein two or more posts are connected to the base.

14. The retaining member according to claim 13, wherein the post through bore extends in a direction substantially perpendicular to the axial direction of the post.

15. The retaining member according to claim 14, wherein the cap through bore extends in a direction substantially perpendicular to the axial direction of the post.

16. The retaining member according to claim 15, wherein the cap fitting extends in an axial direction away from an upper surface of the cap rim.

* * * * *